United States Patent [19]

Carron et al.

[11] 4,381,190

[45] Apr. 26, 1983

[54] PROCESS FOR DRYING AND COMPRESSING CHLORINE GAS

[75] Inventors: Mark S. Carron, Spring Valley, N.Y.; Desmond C. McCarthy, Weston, Conn.

[73] Assignee: Stauffer Chemical Company, Westport, Conn.

[21] Appl. No.: 306,983

[22] Filed: Sep. 18, 1981

[51] Int. Cl.³ ............................................. B01D 53/26
[52] U.S. Cl. ........................................ 55/30; 423/500
[58] Field of Search ...................... 423/500; 55/23, 29, 55/31, 32, 30; 417/68, 69; 34/32, 72, 80, 12

[56] References Cited

U.S. PATENT DOCUMENTS 1,425,938  8/1922  Block ....................................... 55/29
3,994,074 11/1976  Lowther ............................. 55/32 X

*Primary Examiner*—Earl C. Thomas
*Attorney, Agent, or Firm*—Vivienne T. White

[57] ABSTRACT

A process for drying and compressing wet chlorine gas with concentrated sulfuric acid in which the drying and compressing are accomplished utilizing alternating mechanical compressors comprising a liquid ring compressor and a second compressor. The process improves the efficiency of drying and liquifying $Cl_2$ while eliminating the cost for drying towers.

11 Claims, 1 Drawing Figure

PROCESS FOR DRYING AND COMPRESSING CHLORINE GAS

BACKGROUND OF THE INVENTION

1. Field of the Invention

The invention relates to the drying and compressing of gaseous chlorine. More specifically, the invention relates to a more economical process for drying and compressing gaseous chlorine using sulfuric acid.

2. Related Art

Chlorine gas is generally commercially produced in a process wherein an electric current is passed through the typical cell, it functions to convert sodium chloride and water into three primary products: chlorine, hydrogen, and caustic soda (sodium hydroxide solution). The gas produced in the cells is both hot and wet and prior to compression and liquifaction the gas is cooled and dried. To be sold commercially, chlorine gas, as produced by the electrolysis of alkali metal chlorides (brine) in electrolytic cells, is usually compressed to the liquid form.

Various processes have been developed for drying and compressing chlorine gas which employ strong sulfuric acid as a drying agent. It is a general practice in the industry to subject the hot, wet chlorine vapor flowing from the electrolytic cells to cooling, drying and liquifaction procedures. Under these procedures, which are so commonly employed as to be considered industry standards, crude chlorine from the cells is first cooled from about 95° C. to about 15° C., either by direct contact of the crude chlorine vapor with water, or through surface heat exchange of the chlorine or through a combination of direct water and surface exchange. Most of the water vapor and brine spray contaminants are thereby removed. To yield a dry finished product, the cooled gaseous chlorine is then passed in countercurrent contact with concentrated sulfuric acid to accomplish removal of essentially all of the remaining water vapor and brine entrainment. Finally, the gas is compressed and condensed to yield a liquid product.

In another process, the gas is first dried and then cooled just before the gas is compressed. Employment of the above processes results in considerable expenditure for energy, and capital requirement for equipment, such as drying towers.

It is an object of the present invention to provide an improved process for drying and compressing chlorine gas. Another object of the present invention is to provide a process for drying and compressing chlorine gas having reduced cost for processing equipment and electrical energy.

SUMMARY OF THE INVENTION

The objects of the present invention are accomplished in a process comprising drying and compressing wet chlorine gas by contacting the wet chlorine gas with sulfuric acid in alternating drying and compressing stages, wherein the drying and compressing are conducted in a liquid ring compressor and a second mechanical compressor thereby eliminating the need for drying towers.

The invention will be further described with reference to the accompanying drawings.

DETAILED DESCRIPTION OF THE INVENTION

Figure 1:
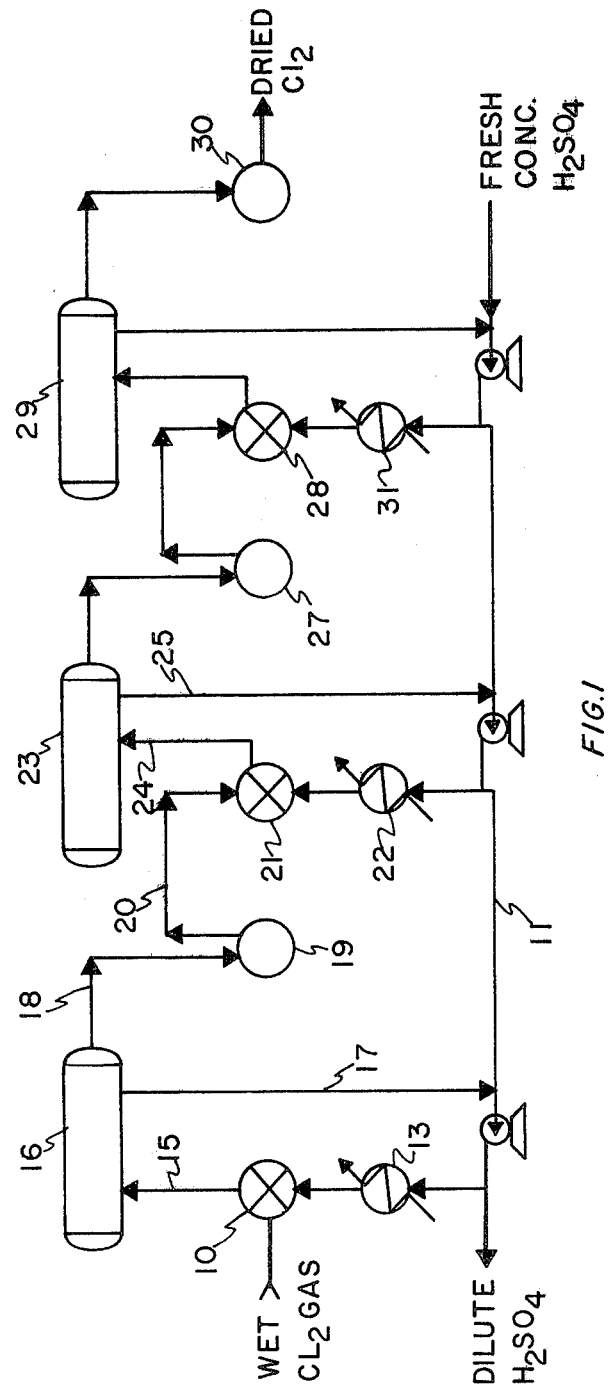
FIG. 1 is a diagramic representation of an embodiment of the invention as disclosed herein.

The invention contemplates the use of mechanical compressors to dry and cool the wet chlorine gas. More particularly, in the practice of the invention, a liquid ring compressor is utilized in combination with another compressor, such as a reciprocating or lobe type compressor, and preferably a centrifugal type compressor all of which are well know types of compressors.

The liquid ring compressor functions by combining a centrifugal action on a service liquid to create a reciprocating type action of the liquid on the gas being compressed. In the operation of the liquid-ring compressor, the service liquid, due to the centrifugal action, assimilates the elliptical shape of the compressor casing to produce an out and in or reciprocating motion to the liquid with each 180° rotation of a shaft mounted multiblade impeller centrally positioned within the casing. As a result, the gas to be compressed is drawn into the vane cavities of the blades with the outward motion of the liquid, and compressed with the inward motion of the liquid as it totally immerses the impeller blades and compresses the gas therein.

Liquid ring compressors are available from several commercial sources such as Nash Engineering Co. of Norwalk, Conn. or Croll-Reynolds Co. Inc. of Westfield, N.J.

In the process of the invention, wet chlorine gas is passed through stages, each comprised of a liquid ring compressor and a centrifugal compressor, countercurrent to the flow of concentrated sulfuric acid which dries the gas in each stage.

In each stage of the process, the crude wet chlorine gas as shown in FIG. 1 is passed into a compressor preferably initially into a first liquid ring compressor containing sulfuric acid. In the process, the sulfuric acid flows countercurrent to the flow of the crude chlorine. The sulfuric acid entering the first liquid ring compressor is therefore somewhat diluted by having dried and partially compressed the gas in the latter stages. Sulfuric acid serves as the sealing fluid and as the drying agent. In the liquid ring compressor, some drying of the wet chlorine gas is performed in addition to some cooling of the gas since sulfuric acid acts as a heat sink. The crude chlorine gas is thereafter conveyed to a separator, which may be an integral part of the liquid ring compressor, where the chlorine is separated from the sulfuric acid. The chlorine gas from the separator is then conveyed to a second mechanical compressor where it is compressed. In the second mechanical compressor, some compression of the crude chlorine is accomplished but due to the heat of compression, the efficiency of these compressors are somewhat diminished and therefore, a plurality of drying and compression stages may be required to obtain the dry liquid chlorine.

The partially dry and compressed gas is thereafter passed to succeeding stages and another liquid ring compressor where it is further cooled, dried and compressed by the action of the sulfuric acid sealant fluid. As in the previous stage, the sulfuric acid functions to dry the wet chlorine and functions as a heat sink to cool the partially compressed gas which has been heated by the compression action (heat of compression). As in the previous stage, after drying and cooling the chlorine in the liquid ring compressor, the gas is again separated from the sulfuric acid and conveyed to a second mechanical compressor where it is further compressed. This process can be repeated as many times as required to dry and compress the chlorine gas to the required pressure.

The improved process of the present invention is applicable to drying and compressing crude wet chlorine gas in general and in particular, to wet chlorine produced in electrolytic chlorine cells of either the mercury, membrane, or diaphram type. The wet gas, at a temperature of from about 60°–80° C. is maintained at a temperature of from about 0° C. to about 130° C. during the drying and compression.

In FIG. 1, hot, wet chlorine is received from the electrolytic cells (not shown) and is fed to the first liquid ring compressor 10 where it flows through the compressor concurrently to the sealing fluid sulfuric acid, which partially dries and cools the gas by removing water and heat. The sulfuric acid is introduced to compressor 10 through heat exchanger 13 from line 11.

Partially dried chlorine gas leaves the liquid ring compressor 10 via line 15 and is fed to a separator 16 where the gas is separated from entrained sulfuric acid which is returned to line 11 through line 17. The chlorine gas leaves separator 16 via line 18 and is fed to centrifugal compressor 19 where it is further compressed. Thereafter, the compressed gas is fed via line 20 to the second stage liquid ring compressor 21 and further dried and compressed by contact with the sulfuric acid. As in the first stage, the sulfuric acid is fed to the liquid ring compressor 21 from line 11 through heat exchanger 22. The chlorine gas leaving the second stage liquid ring compressor 21 is again fed to a separator 23 via line 24 where the sulfuric acid contained therein is removed via line 25 and returned to line 11. The chlorine gas is then fed via line 26 to a second centrifugal compressor 27 where it is further compressed. This process can be repeated a third time as is shown in the embodiment presented, by passing the compressed chlorine gas through a third stage liquid ring compressor 28 and a third separator 29 and from the separator the dried compressed gas is fed to a centrifugal compressor 30 from which the dry and compressed chlorine can be liquified.

At least two stages, comprised of a liquid ring compressor and another compressor such as a centrifugal compressor are used in the process of the invention. Any liquid ring compressor can be utilized in the process. Such compressors may contain intergral separators for separating the partially dried gas from the increasingly dilute sulfuric acid service fluid.

Fresh sulfuric acid is preferably introduced into the liquid ring compressor 28 of the last stage through heat exchanger 31 at a concentration of from about 93% to about 98% by weight $H_2SO_4$. Acid continuously withdrawn from each liquid ring compressor is separated from and circulated through the heat exchangers in a countercurrent flow to the wet gas. In heat exchangers, the acid is cooled to a temperature from about 0° C. to about 30° C. by means of chilled brine or chlorine water.

Although, in the embodiment shown, the crude chlorine gas is initially conveyed to a liquid ring compressor to initiate the process of the invention, the process also contemplates introducing the crude gas first into a centrifugal compressor and from there to a liquid ring compressor and separator, the choice being dependent on the initial temperature of the crude chlorine gas discharged from the electrolytic cells.

What is claimed:

1. A method of drying and compressing wet chlorine gas which comprises: passing the chlorine gas to be dried and compressed into at least one compression stage comprising a liquid ring compressor using sulfuric acid as the liquid medium and a second mechanical compressor.

2. The method of claim 1 further comprising means for separating sulfuric acid from the chlorine entering the second mechanical compressor of each stage.

3. A process for drying and compressing wet chlorine gas comprising at least one drying and compression stage wherein the gas is dried and compressed using sulfuric acid as the drying liquid wherein the process comprises
    (a) introduced the wet gas into a liquid ring compressor containing sulfuric acid, for partially drying the wet chlorine, thereafter;
    (b) separating the dried chlorine leaving the liquid ring compressor from entrained sulfuric acid in a separator;
    (c) introducing the chlorine into a second mechanical compressor where it is compressed.

4. The process of claim 3 further comprising repeating steps a through c.

5. The process of claim 1, 2, 3 or 4 wherein the second mechanical compressor is a centrifugal compressor.

6. The process of claims 1, 2, 3, or 4 wherein the second mechanical compressor is a Lobe compressor.

7. The process of claims 1, 2, 3 or 4 wherein the second mechanical compressor is a reciprocating compressor.

8. The process of claims 1, 2, 3, 4 wherein the chlorine is maintained at a temperature of from about 0° C. to about 130° C.

9. The process of claims 1, 2, or 3 wherein fresh sulfuric acid is introduced into the process in the liquid ring compressor of the last stage.

10. The process of claim 9 wherein the fresh sulfuric acid has a concentration of from about 93% to about 98% by weight $H_2SO_4$.

11. The process of claims 1, 2 or 3 further comprising cooling the sulfuric acid in heat exchangers to a temperature of from about 0° C. to about 30° C. before it enters the liquid ring compressor of each stage.

* * * * *

UNITED STATES PATENT AND TRADEMARK OFFICE
CERTIFICATE OF CORRECTION

PATENT NO. : 4,381,190
DATED : April 26, 1983
INVENTOR(S) : Mark S. Carron et al.

It is certified that error appears in the above—identified patent and that said Letters Patent is hereby corrected as shown below:

Col. 1, lines 19 and 30, "liquifaction" should be -- liquefaction --;

Col. 4, line 29, "introduced" should be -- introducing --;

Col. 4, line 34, after the semi-colon [;], insert the word -- and --;

Col. 4, line 39, "claim" should be -- claims --; and

Col. 4, line 46, after "3," insert the word -- or --.

Signed and Sealed this

Eighteenth Day of October 1983

[SEAL]

Attest:

GERALD J. MOSSINGHOFF

Attesting Officer    Commissioner of Patents and Trademarks